Aug. 19, 1969

KOZO YAMAMOTO 3,462,057

TAPE GUIDE DEVICE FOR MAGNETIC RECORDING AND REPRODUCING APPARATUS

Filed Dec. 11, 1967

INVENTOR

KOZO YAMAMOTO

BY Stevens, Davis, Miller & Mosher

ATTORNEYS

United States Patent Office 3,462,057
Patented Aug. 19, 1969

3,462,057

TAPE GUIDE DEVICE FOR MAGNETIC RECORDING AND REPRODUCING APPARATUS

Kozo Yamamoto, Hirakata-shi, Japan, assignor to Matsushita Electric Industrial Co., Ltd., Osaka, Japan, a corporation of Japan
Filed Dec. 11, 1967, Ser. No. 689,550
Claims priority, application Japan, Feb. 3, 1967, 42/9,651; Feb. 10, 1967, 42/11,523
Int. Cl. B65h *27/00*
U.S. Cl. 226—181 3 Claims

ABSTRACT OF THE DISCLOSURE

A tape guide device for a magnetic recording and reproducing apparatus having a tape guide member which acts to prevent a magnetic tape from entwining around the capstan even with an insufficient take-up force for the magnetic tape at the beginning of the tape drive, and at the same time, ensures a smooth drive for the magnetic tape. The tape guide member consists of a semi-cylindrical body and a bent strip formed integrally with the body, and may have felt ring retainers also integrally formed therewith.

Background of the invention

This invention relates to a tape guide device for magnetic recording and reproducing apparatus, and more particularly to a tape guide device having a tape guide means which is effective to prevent a magnetic tape from entwining around the capstan during the operation of the magnetic recording and reproducing apparatus to thereby ensure a smooth drive for the magnetic tape.

Conventional tape guide systems employed in, for example, magnetic recording and reproducing apparatus of the adapted to operate with an endless magnetic tape have encountered with various troubles at the beginning of the tape drive in case the magnetic tape which is loosely wound around a tape reel is driven by the capstan and the pinch roller for the sake of recording or reproduction. The prior troubles described above have resulted from the fact that, due to a very weak take-up force or the complete absence of such a take-up force at the beginning of the tape drive, the endless magnetic tape unwound from the reel by being drawn by the capstan and the pinch roller is bent to follow a tortuous path and entwines around the capstan, thus giving rise to an impossibility for the tape to properly run, damage to the tape, and in a worst case, damage to the recording and reproducing mechanism of the apparatus.

Summary of the invention

It is therefore an important object of the present invention to provide a tape guide device for use in a magnetic recording and reproducing apparatus comprising a novel tape guide means which, in spite of a simple structure and a low cost of manufacture, can successfully prevent a magnetic tape from entwining around the capstan even in the event of the substantial absence of a force to properly take up the magnetic tape.

Another important object of the present invention is to provide a capstan bearing structure comprising a one-piece member which can singly perform a dual function of preventing a magnetic tape from entwining around the capstan and applying oil-containing felt rings onto oilless bearings to ensure the desired smooth rotation of the capstan.

Brief description of the drawings

Throughout the drawings, like reference numerals are used to denote like parts.

Description of the preferred embodiments

Figure 1:
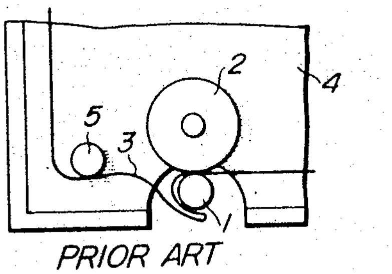
FIG. 1 is a plan view showing a part of a prior magnetic recording and reproducing apparatus.

Referring first to FIG. 1, a tape guide device in a prior magnetic recording and reproducing apparatus which is devoid of the tape guide means according to the present invention will be described so that the novelty of the present invention can more clearly be understood. FIG. 1 illustrates a state in which a magnetic tape 3 being fed in its advancing direction by a capstan 1 and a pinch roller 2 takes a tortuous path deviated from the normal traveling path and is thereby about to entwine around the capstan 1. In FIG. 1, the reference numerals 4 and 5 designate a base plate of the tape cartridge and a tape guide roller, respectively.

Figure 2:
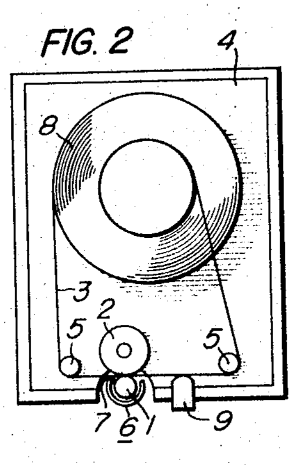
PRIOR ART FIG. 2
FIG. 2 is a plan view showing a part of a magnetic recording and reproducing apparatus equipped with a tape guide device embodying the present invention.
Figure 3:
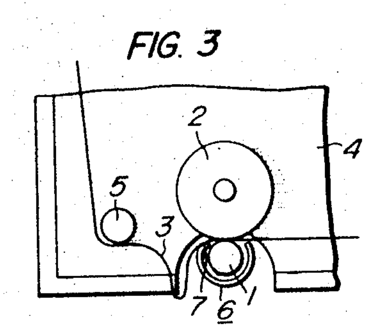
FIG. 3 is an enlarged plan view of a part of the tape guide device shown in FIG. 2.
Figure 4:
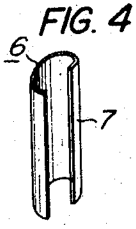
FIG. 4 is a perspective view showing one form of a tape guide means in the tape guide device according to the present invention.

The tape guide device of the present invention for use in a magnetic recording and reproducing apparatus is proposed to eliminate the prior defect pointed out in the above and will be first described with referfence to FIGS. 2 to 4. The tape guide device according to the present invention comprises a tape guide member or tape entwinement preventive member 6 of a substantially semi-cylindrical shape which has one of longitudinal sides thereof slightly inwardly bent to form a bent strip 7 thereat. The tape entwinement preventive member 6 having such a structure is disposed in a substantially concentrical relation with the capstan 1 so that the member 6 partly encompasses the capstan 1 in a slightly spaced relation therefrom with its bent strip 7 lying on the advancing side of an endless magnetic tape 3 leaving the capstan 1 and the pinch roller 2. Further, the bent strip 7 provided on the tape entwinement preventive member 6 is directed toward the contact point between the capstan 1 and the pinch roller 2 in such a relation that the bent strip 7 is kept away from contact with the magnetic tape 3 when the magnetic tape 3 is normally fed by the capstan 1 and the pinch roller 2. The magnetic tape 3 is endlessly wound around a tape mounting member 8 and is arranged to run past a pair of tape guide rollers 5 and a magnetic head 9 by being driven by the capstan 1 and the pinch roller 2 in the usual manner.

In case the magnetic tape 3 is loosely wound around the tape mounting member 8 with a plurality of internal gaps between the tape layers due to an insufficient take-up force developed by the tape mounting member 8, the magnetic tape 3 fed out from between the capstan 1 and the pinch roller 2 at the beginning of the tape drive may be bent to follow a tortuous path as shown in FIG. 3. In accordance with the present invention, however, the magnetic tape 3 running along such a tortuous path is prevented from contacting and entwining around the capstan 1, as shown in FIG. 3, by virtue of the provision of the tape entwinement preventive member 6 of the structure. The magnetic tape 3 is therefore protected against any injury thereto and can gradually resume its normal traveling path as it is successively released from the tape mounting member 8. The bent strip 7 forming a part of the tape entwinement preventive member 6 may preferably be spaced from the capstan 1 over a distance in the order of 0.2 to 0.5 millimeter in order that the bent strip 7 can successfully act to prevent unintentional intrusion of the magnetic tape 3 into a space defined between the capstan 1 and the tape entwinement preventive member 6, which intrusion may take place in case the magnetic tape 3 is bent to follow a tortuous path as shown.

From the foregoing description, it will be understood that the tape guide device according to the present invention comprises a tape entwinement preventive member which is so disposed as to partly encompass the capstan in a suitably spaced relation from the capstan which is forced onto the pinch roller to drive a magnetic tape. Since the magnetic tape fed out from between the capstan and the pinch roller is thereby entirely freed from any entwining movement around the capstan even if the magnetic tape is bent to follow a tortuous path, such an undesirable operational trouble would not arise in which the magnetic tape is damaged by entwining around the capstan and is rendered incapable of making the proper trouble. The tape guide device according to the present invention is further advantageous in that it is simple in structure and can be manufactured at a low cost. Although the above embodiment has referred to its application to a magnetic recording and reproducing apparatus of the type employing an endless magnetic tape, it will be apparent that it is also applicable to a magnetic recording and reproducing apparatus of the kind employing a magnetic tape which is trained around two tape reels.

Figure 5:
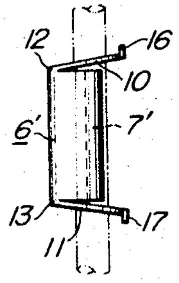
FIGS. 5 and 6 are a front elevational view and a perspective view, respectively, of another form of the tape guide means employed in the tape guide device according to the present invention.
Figure 6:
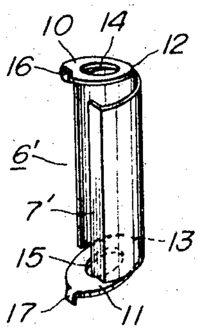
Figure 7:
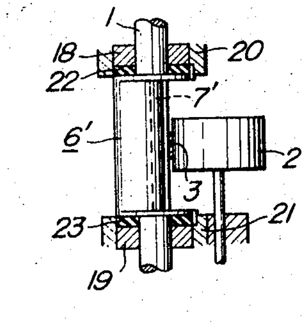
FIG. 7 is a partly sectional front elevational view showing a part of a capstan bearing structure assembled together with the tape guide means shown in FIGS. 5 and 6.

Referring now to FIGS. 5 to 7 showing another embodiment of the present invention, a capstan 1 is drivingly engaged with a rotatable pinch roller 2, with a magnetic tape 3 interposed therebetween. The capstan 1 is rotatably journaled in oilless bearings 18 and 19. The magnetic tape 3 is held between the capstan 1 and the pinch roller 2 in a manner as described above and is driven at a predetermined constant speed by the rotating capstan 1. Bearing bosses 20 and 21 for holding the respective oilless bearings 18 and 19 therein are formed integrally with the body of a magnetic recording and reproducing apparatus (not shown). Felt rings 22 and 23 containing therein a suitable amount of lubricating oil are urged by a tape guide member 6′ onto the lower face of the oilless bearings 18 and the upper face of the oilless bearing 19, respectively.

The tape guide member 6′ has a substantially semicylindrical shape and is made from a resilient metal material such as Phosphor bronze or stainless steel in a sheet form so as to resiliently force the oil-containing felt rings 22 and 23 onto the respective oilless bearings 18 and 19. The tape guide member 6′ is disposed adjacent to the capstan 1 in a substantially concentrical relation therewith in such a manner as to partly encompass the capstan 1, and has one of longitudinal sides thereof slightly inwardly bent to form an entwinement preventive strip 7′ which acts to prevent possible entwinement of the magnetic tape 3 around the capstan 1. Resilient strips 10 and 11 in a planar sheet form to serve as retainers for the felt rings 22 and 23 extend from the upper end 12 and the lower end 13 of the tape guide member 6′ and have aligned, central, circular perforations 14 and 15 therethrough for rotatably receiving therein the capstan 1, respectively. The resilient felt retainers 10 and 11 have their free ends bent upwardly and downwardly to form an upwardly directed lug 16 and a downwardly directed lug 17, respectively. These lugs 16 and 17 are adapted to positively and snugly fit in respective recesses provided in the bearing bosses 20 and 21 for the capstan 1 when the tape guide member 6′ is merely fitted in position between the upper and lower oilless bearings 18 and 19. It is to be understood that the tape guide member 6′ has a suitable height so that, when the tape guide member 6′ is mounted to partly encompass the capstan 1, the resilient felt retainers 10 and 11 impart a suitable pressure to the oil-containing felt rings 2 and 23 to urge them into oil supply contact with the respective oilless bearings 18 and 19.

It will be understood that, in the capstan bearing structure according to the present invention, the tape guide member 6′ is provided with the entwinement preventive strip 7′ for preventing the entwinement of the magnetic tape 3 around the capstan 1 and is also provided with the upper and lower resilient retainers 10 and 11 for retaining the oil-containing felt rings 22 and 23 in their lubricating engagement with the respective oilless bearings 18 and 19. In accordance with the above bearing structure, mere fitting of the lugs 16 and 17 provided at the free ends of the felt retainers 10 and 11 in the corresponding recesses of the bearing bosses 20 and 21 can securely fix the tape guide member 6′ in the predetermined position. The tape guide member 6′ can be easily dismounted from its mounted position between the bearing bosses 20 and 21 by virtue of the resilient nature of the felt retainers 10 and 11 which are integral with the tape guide member 6′.

It will be apparent from the foregoing description that the capstan bearing structure according to the present invention exhibits marked effects in that the entwinement of a magnetic tape around the capstan can be obviated by the provision of an entwinement preventive strip formed by inwardly bending one of the longitudinal sides of a tape guide member disposed in the vicinity of the capstan, and the necessity of bonding the oil-containing felt rings to the oilless bearings can be obviated by virtue of the provision of felt retainers formed integrally with the tape guide member. The provision of the entwinement protective strip and the felt retainers in the integral relation with the tape guide member is quite advantageous in the desired reduction of the cost by virtue of the reduction in the time for the assembling, in the maintenance cost and in the amount of material. Further, an improved workability can be expected since the tape guide member supporting the oil-containing felt rings can be secured in place by mere insertion thereof between the bearing bosses and since the ease of dismounting of the tape guide member facilitates the replacement of the oil-containing felt rings when so required. Moreover, since the felt retainers extending from the tape guide member are operative to bodily force the felt rings onto the oilless bearings, the felt rings provide a high oil reserving effect, are only exposed to the atmosphere at a very small area with the resultant freedom from the attachment of dust or like harmful matters, and can maintain the oil reserving effect for a long period of time because the lubricating oil is difficult to dry up.

I claim:

1. A tape guide device for a magnetic recording and reproducing apparatus comprising a generally semi-cylindrical tape guide means consisting of a substantially semi-cylindrical body and a bent strip formed as an integral part of said body, said tape guide means being so disposed as to partly encompass a capstan in a suitably spaced relation from the capstan which is drivingly engaged with a pinch roller for driving a magnetic tape, said bent strip being disposed on the side remote from a magnetic head in the advancing direction of the magnetic tape in such a relation that said bent strip is slightly spaced from the magnetic tape when the magnetic tape is driven in its normally running state.

2. A capstan bearing structure comprising a pair of spaced oilless bearings rotatably supporting a capstan therein, an oil-containing felt ring closely engaging each said oilless bearing for lubricating oil supply thereto, and a generally semi-cylindrical tape guide means interposed between said oil-containing felt rings, said tape guide means having a substantially semi-cylindrical body, a tape entwinement preventive strip formed by slightly inwardly bending one of longitudinal sides of said body, and a pair of felt ring retainers of resilient nature extending obliquely upwardly and downwardly from the upper and lower ends of said body, respectively for resiliently urging said oil-containing felt rings onto said oilless bearings, said felt ring retainers having aligned central perforations to allow for free insertion of the capstan therethrough.

3. A capstan bearing structure according to claim 2, further comprising a lug extending from each said felt ring retainers, on said semi-cylindrical body so as to tightly hold said oil-containing felt rings thereby.

References Cited

UNITED STATES PATENTS 3,306,510 2/1967 Brumbaugh -------- 226—196 X
3,415,437 12/1968 Coulson ----------- 226—196 X M. HENSON WOOD, Jr., Primary Examiner R. A. SCHACHER, Assistant Examiner U.S. Cl. X.R.

226—194, 196